United States Patent [19]
Klar et al.

[11] 3,711,714
[45] Jan. 16, 1973

[54] DEVICE FOR DETERMINING THE NEUTRON FLUX DISTRIBUTION IN A NUCLEAR REACTOR

[75] Inventors: Erich Klar; Peter Schmid; Hans-Peter Schabert, all of Erlangen, Germany

[73] Assignee: Siemens Aktiengesellschaft, Berlin and Munich, Germany

[22] Filed: June 8, 1970

[21] Appl. No.: 44,107

[30] Foreign Application Priority Data

June 14, 1969 Germany..................P 19 30 439.3

[52] U.S. Cl. ..........................250/83.1, 250/106 T
[51] Int. Cl. ...............................................G01t 3/00
[58] Field of Search ..........................250/83.1, 106 T

[56] References Cited

UNITED STATES PATENTS

| | | | |
|---|---|---|---|
| 3,147,379 | 9/1964 | Harris | 250/83.1 |
| 3,299,268 | 1/1967 | Muto et al. | 250/83.1 |
| 3,431,416 | 3/1969 | Jones, Jr. et al. | 250/83.1 X |

FOREIGN PATENTS OR APPLICATIONS 1,181,788  2/1970  Great Britain.......................250/83.1

Primary Examiner—Archie R. Borchelt
Attorney—Curt M. Avery, Arthur E. Wilfond, Herbert L. Lerner and Daniel J. Tick

[57] ABSTRACT

Stationary evaluating means is positioned outside the nuclear reactor in operative proximity with the transfer tubes extending into the reactor. The evaluating means measures the activity of stationary columns of balls in the transfer tubes. The stationary evaluating means extends alongside a plurality of transfer tubes and comprises a plurality of radiation detectors devices connected in parallel.

17 Claims, 3 Drawing Figures

3,711,714

DEVICE FOR DETERMINING THE NEUTRON FLUX DISTRIBUTION IN A NUCLEAR REACTOR

DESCRIPTION OF THE INVENTION

The invention relates to nuclear reactors. More particularly, the invention relates to a device for determining the flow distribution in a nuclear reactor.

The device of the invention determines the flow distribution of neutrons in the fission zone of a nuclear reactor by means of activatable solid probes. The device comprises transfer tubes which extend into the fission zone and the reactor container wall. A plurality of loosely joined activatable balls are positioned in columns in the transfer tubes and are movable in and out of the fission zone by gas or air under pressure. A stationary evaluating device is positioned outside the reactor pressure vessel adjacent of the transfer tubes.

Thus, it is known to utilize probes comprising columns of loosely joined balls which are in measuring tubes in the reactor. The balls may be stored in a drum before or after their activation, and are then fed to a evaluation device.

The balls generally comprise a material containing manganese which shows a relatively high half life period of 2.58 hours. The high half life period considerably limits the availability of the same column of balls for repetitive measurement. If it is desirable to utilize the balls for measurements more than once a day, which is almost always absolutely necessary from an operational point of view, ball storage apparatus such as, for example, storage drums, must be utilized, as well as numerous control elements such as valves and switches. Furthermore, the measurement of the simultaneously irradiated ball columns occurs consecutively. The time for the measurement of the flow distribution is thus more than one hour for each measurement.

The principal object of the invention is to provide a new and improved device for determining the flow distribution in a nuclear reactor.

An object of the invention is to provide a device for determining the flow distribution in a nuclear reactor wherein the same balls may be utilized for consecutive measurements in short time intervals.

An object of the invention is to provide a device for determining the flow distribution in a nuclear reactor wherein simultaneously irradiated balls are measured substantially simultaneously.

An object of the invention is to provide a device for determining the flow distribution in a nuclear reactor, which device dispenses with switches, valves and storage drums.

An object of the invention is to provide a device for determining the flow distribution in a nuclear reactor, which device is inexpensive in manufacture and operation, and is efficient, effective and reliable in operation.

In accordance with the invention, the activated ball columns are measured, when stationary, by evaluating means comprising one or more evaluating devices along one or more transfer tubes in which the ball columns are positioned. Each of the evaluating devices comprises a plurality of radiation detectors devices in parallel arrangement with each other. The evaluation time for the activity measurement is considerably reduced due to the simultaneous measurement of the different ball columns.

In order to permit the reuse of the balls for activity measurement or evaluation shortly after the measurements, it is preferable that said balls comprise a material whose critical components have a short half life period measurable by minutes. A preferable alloy material for each ball utilizes iron as the principal ingredient and comprises the following components 0.60 to 0.65 percent by weight of carbon, 14.0 to 15.0 percent by weight of chromium, 1.2 to 1.4 percent by weight of vanadium, and impurities of silicon, manganese, molybdenum and aluminum, each of which is provided at less than 0.1 percent by weight.

The use of material including vanadium reduces the half life period to 3.77 minutes. It is therefore possible to reuse the same balls in time periods of little more than 10 minutes, again and again, for flow distribution measurements. Since the balls are guided directly to an evaluating device, after their activation, all mechanical components are eliminated, and the reliability of the measuring system is considerably enhanced.

The individual radiation detectors of the activity measuring sections may comprise semiconductor detectors or Geiger-Mueller counters. To permit simultaneous measurement of the columns of balls an individual evaluating device may be assigned to each tube. This permits rapid evaluation of the ball columns. On the other hand, an evaluating device may be provided in common for several transfer tubes in order to measure consecutive individual columns of balls. The ball column of each of the transfer tubes is fed consecutively to the corresponding evaluating device.

In order to measure a great number of columns of balls, it is advantageous to join the transfer tubes in groups whereby the number of evaluating devices equals the number of transfer tubes of a group and the individual ball columns of a group are simultaneously measured. In order to utilize a minimum of individual radiation detectors, the ball columns may also be measured in sections. In such an event, ball stops are provided after the evaluating device and correspond to the length of the evaluating device.

The ball columns may be stored directly in the transfer tubes during the time period between consecutive activations, when simultaneous measurement occurs. It is also possible, however, to store the ball columns in a drum during such period of time. The drum has several storage ducts which are coordinated to the appropriate ball transfer tubes to which they may be coupled.

When the individual ball columns are measured consecutively, it is advantageous to provide ball stops in the individual transfer columns. The ball stops are provided at distances of one ball column length from the active part of the nuclear reactor. The ball columns may therefore be stored after their activation and before their measurement in the transfer tubes between the nuclear reactor and the ball stops, and after the measurement, before the ball stops on the measuring side. This permits economization with regard to additional storage units and the reuse of the balls.

It is advantageous when, upon the joining of the transfer tubes of the ball columns into groups, each group is connected to a common source of air pressure. Each air pressure source may comprise a humidity sensor, a manometer and a rapid closing valve for disconnection of a group of transfer tubes which may be defective. These safety devices are utilized in the event of a leak in one of the probes which creates the possibility that cooling fluid from the nuclear reactor may enter the measuring devices.

Several indicating components or devices may be eliminated by staggering the indicating devices of the parallel-connected evaluating devices of a group. Furthermore, it is possible to position the indicating components, when the ball column area is activated in the lower quarter of the nuclear reactor, at greater distances than in the remaining evaluating devices, since the flow distribution in the lower part of the reactor is generally considerably more uniform than in the upper part in which the control rods are partially immersed.

In order to prevent the ball columns from being pulled apart during their movement back and forth, back pressure valves may be inserted into the exhaust conduits of each air pressure source.

In order that the invention may be readily carried into effect, it will now be described with reference to the accompanying drawings, wherein.

In the Figures, the same components are identified by the same reference numerals.

Figure 1:
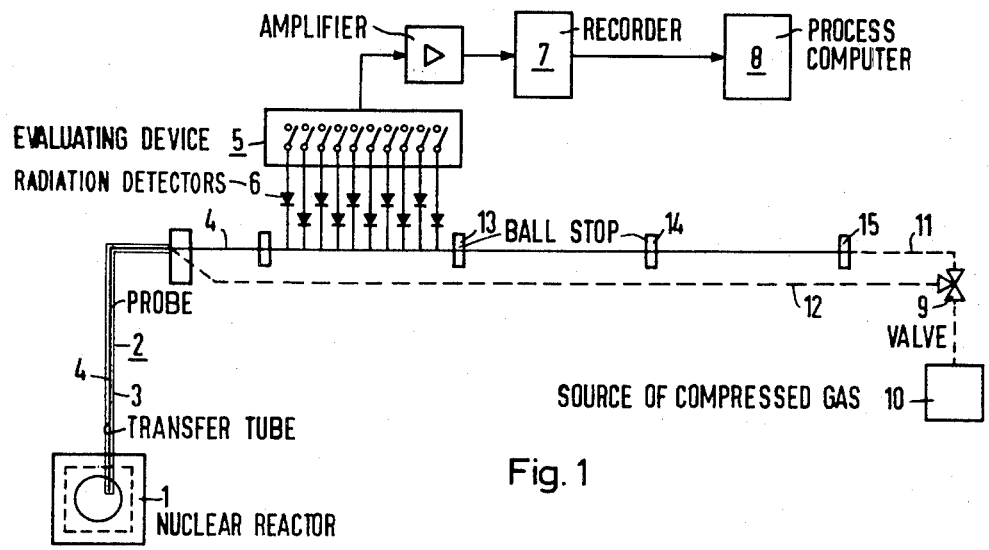
FIG. 1 is a schematic diagram of an embodiment of the device of the invention for determining the flow distribution in a nuclear reactor.
Figure 3:
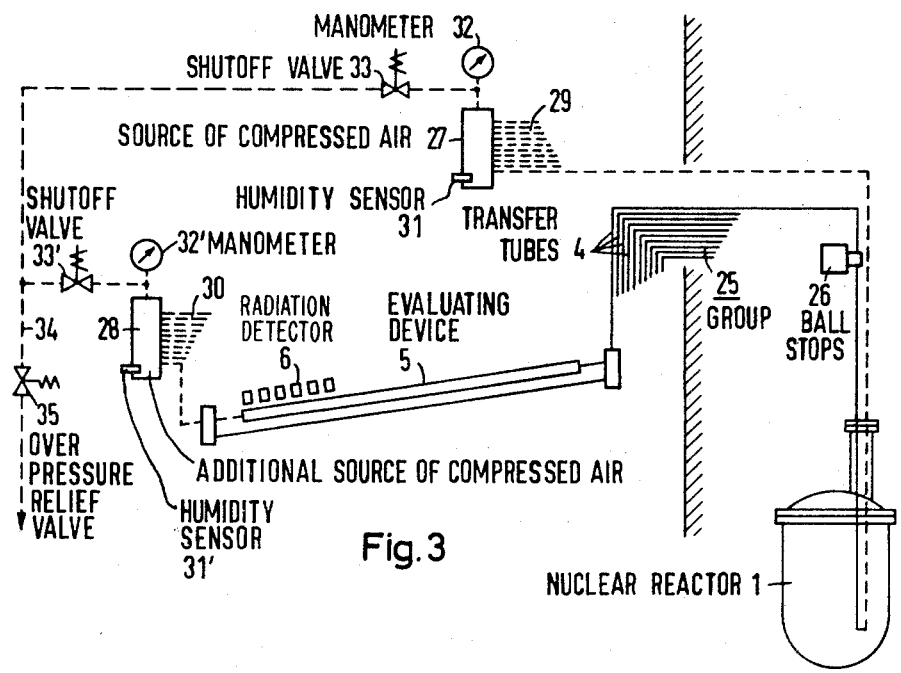
FIG. 3 is a schematic diagram of another embodiment of the device of the invention for determining the flow distribution in a nuclear reactor.
Figure 2:
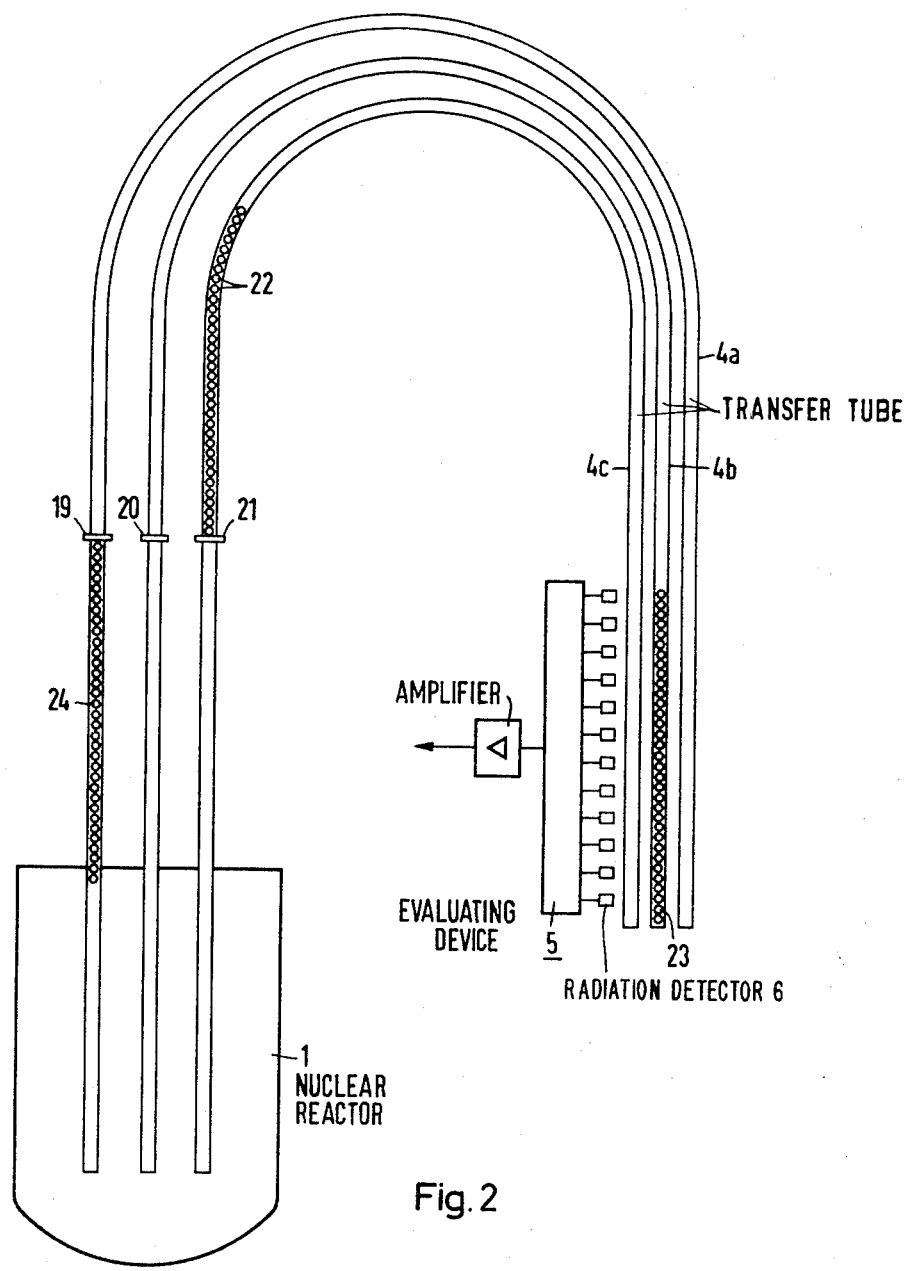
FIG. 2 is a schematic diagram of another embodiment of the device of the invention for determining the flow distribution in a nuclear reactor.

In the embodiment of FIG. 1, each transfer tube has its own coordinated evaluating device. In the embodiment of FIG. 2, several transfer tubes are serviced by a common evaluating device. In the embodiment of FIG. 3, several transfer tubes and evaluating devices are included in groups.

In order to maintain the clarity of illustration, each figure illustrates only a single measuring system, although in actual practice a plurality of such measuring systems are utilized, in parallel relation with each other. A probe 2, which is in the shape of a tube, extends into a nuclear reactor 1. The probe 2 comprises an outer shell 3 and an inner tube 4 for the ball columns. The space between the outer shell 3 and the inner or transfer tube 4 of the probe 2 functions to supply compressed air or gas during the movement of the ball columns in and out of said probe.

Above the nuclear reactor 1, the transfer tube 4 passes an evaluating device 5. The evaluating device 5 comprises a plurality of individual radiation detectors 6. Each of the radiation detectors 6 comprises, for example, a semiconductor detector of a Geiger-Mueller counter tube. The evaluating device 5 produces an output signal or pulse which indicates the measurement or measuring value. The output signal of the evaluating device 5 is amplified by an amplifier and supplied to a recorder 7 which records such signal, and therefore the indication of the measurement. The recorder 7 is connected to a process computer 8 for storage and evaluation of the measurements of measuring values.

A source 10 of compressed gas is coupled to the end of the transfer tube 4 of the probe 2 via a three way valve 9. The source 10 of compressed gas provides compressed air or compressed gas for transferring the balls in the transfer tube 4. At the commencement of the measurement operation, the compressed gas is supplied to the transfer tube 4 due to the proper setting of the valve 9. The compressed gas supplied to the transfer tube 4 urges the balls in said transfer tube into the ball probe 2 of the reactor 1. After the balls in the probe 2 have been activated, the valve 9 is adjusted, so that the compressed gas from the source 10 is supplied via a conduit 12 into the space between the outer shell 3 and the transfer tube 4 of the ball probe 2. The compressed gas is thus supplied to the transfer tube 4 from the bottom thereof in the nuclear reactor 1, and thus urges or lifts the balls out of said nuclear reactor.

In the embodiment of FIG. 1, the columns of balls pass the evaluating device 5 in sections. The ball stop 13, immediately after the measuring area, is therefore first closed, in order to stop the ball column, which has left the reactor, at such point.

After the evaluating device 5 has measured the activity of the ball column positioned in the measuring zone of said evaluating device, the ball stop 13 is opened and the ball column is moved by the compressed gas to the next ball stop 14, which is then closed. This permits the second ball column to be measured by the evaluating device 5, upon closing of the ball stop 13. The ball stop 14 is then opened and the first ball column is moved by the compressed gas to the ball stop 15, which is then closed. The ball stop 14 is then closed and the ball stop 13 is opened, so that the second ball column is moved into the area between the ball stops 13 and 14. The ball stop 13 is then closed, so that a third ball column is positioned in the measuring area for measurement by the evaluating device 5.

Each of the ball columns remains in its position until the next measurement operation. It is, however, possible to provide a storage drum at the end of the transfer tube after the ball stop 15. The storage drum is provided with a plurality of storage ducts equal in number to the transfer tubes.

In the embodiment of FIG. 2, a group of several transfer tubes may be measured by a single evaluating device 5. This permits a plurality of groups of transfer tubes to be positioned parallel to each other. In the embodiment of FIG. 2, one group of transfer tubes includes three parallel transfer tubes 4a, 4b and 4c. One end of each of the transfer tubes 4a, 4b and 4c extends into the nuclear reactor 1. The other end of each of the transfer tubes 4a, 4b and 4c extends into operative proximity with a stationary evaluating device 5 which is positioned in common with said transfer tubes.

The transfer tube 4a has a ball stop 19 provided therein at a distance of approximately one ball column length from the nuclear reactor 1. The transfer tube 4b has a ball stop 20 therein at a distance from the nuclear reactor 1 of approximately one ball column length. The transfer tube 4c has a ball stop 21 provided therein at a distance from the nuclear reactor 1 of approximately one ball column length. The ball columns 19, 20 and 21 function to hold the columns of balls before and after measurement of the activity thereof, as illustrated in FIG. 2.

In order to maintain the clarity of illustration, the source 10 of compressed gas or air is not shown in FIG. 2.

After the ball columns are activated in the core of the nuclear reactor, the activity of the individual ball columns is measured in the following manner. At first, all three ball stops 19, 20 and 21 are closed. The compressed air or gas is then supplied in a manner whereby the columns of balls are forced upward against the ball stops 19, 20 and 21 by such compressed air or gas and are maintained in such positions until one of said ball stops is opened so that the column of balls in the transfer tube of the opened ball stop is moved to the evaluating device 5. After the activity of the moved ball column has been measured, the corresponding ball stop is closed and said ball column is returned to the closed ball stop which then holds the column of balls. The newly closed ball stop holds the column of balls above it until the next activation of said column of balls, when said ball stop is opened so that the column of balls enters into the nuclear reactor.

The aforedescribed operation is illustrated in FIG. 2, wherein a column of balls 22 has had its activity measured by the evaluating device 5 and is maintained in position in the transfer tube 4a above the ball stop 21, which is closed. A column of balls 23 in the transfer tube 4b is being measured by the evaluating device 5 in FIG. 2. A column of balls 24 in the transfer tube 4b is held in position beneath the ball stop 19 above the nuclear reactor 1. After the column of balls 23 in the transfer tube 4b has been measured, it is moved by compressed air or gas to the ball stop 20, which, at such time is closed. The ball stop 19 is then opened and the column of balls 24 is moved by the compressed air or gas into operative proximity with the evaluating device 5.

If, for example, 30 probes and transfer tubes, comprising 10 parallel groups each having three parallel probes and transfer tubes, are provided, 10 columns of balls may be simultaneously measured in the embodiment of FIG. 2.

In the embodiment of FIG. 3, pluralities of transfer tubes are provided in groups. The source of compressed gas or air is provided in the embodiment of FIG. 3 for each group of transfer tubes. Thus, for example, 40 probes and transfer tubes may be provided in four groups of 10 probes and transfer tubes each. One such group of 10 probes and 10 transfer tubes is shown in FIG. 3. The remaining three groups are not shown in order to maintain the clarity of illustration.

Ten transfer tubes 4, comprising a group 25 of transfer tubes, are provided between the nuclear reactor 1 and the evaluating device 5. At a suitable distance from the nuclear reactor 1, each of the transfer tubes 4 is provided with a ball stop 26. A separate evaluating device 5 is provided for each transfer tube 4, so that 10 evaluating devices, connected in parallel, are provided. This permits all the ball columns of a specific group to be measured in parallel. Thus, in order to measure the activity of all 40 ball columns, four measurements are required in the embodiment of FIG. 3.

In order to move the columns of balls in each of the transfer tubes 4 of the group 25 of transfer tubes, 10 air ducts 29 extend from a source 27 of compressed air or gas and ten air ducts 30 extend from an additional source 28 of compressed air or gas. The air ducts 29 extend from the source 27 of compressed air directly into the nuclear reactor 1 and open at their lower ends into the transfer tube 4. The air ducts 30 of the source 28 of compressed air extend directly to their ends of the transfer tubes 4 on the opposite side of the evaluating device 5 from the nuclear reactor 1.

In order to activate the columns of balls, compressed air is forced into the ducts 30 from the source 28 of compressed air and urges said columns of balls into the nuclear reactor 1 in the transfer tubes 4. After the balls are activated, they are urged by compressed air in the ducts 29 from the source 27 of compressed air back through the transfer tubes to the ball stops 26. The columns of balls are held in position by the ball stops 26 when said ball stops are closed. When the ball stops 26 are opened, the corresponding columns of balls are moved to operative proximity with the corresponding one of the evaluating devices 5.

In order to determine leaks in the individual probes, each of the sources 27 and 28 of compressed air is provided with a humidity sensor 31 and 31', respectively, a manometer 32 and 32', respectively, and a rapid shutoff valve 33 and 33', respectively. The rapid shutoff valves 33 and 33' function to cut off the appropriate group of probes. After one group of 10 probes is cut off, the remaining three groups, comprising 30 probes, altogether, remain in operation.

To prevent to much separation between the balls of the columns of balls leaving the nuclear reactor 1, an over-pressure relief valve 35 is provided in an air outlet duct 34 of the sources 27 and 28 of compressed air. The pressure in front of the column of balls is increased via the over-pressure relief valve 35 in order to prevent separation of the balls of a column of balls.

When a plurality of columns of balls are simultaneously measured or evaluated, the columns of balls may be staggered in order to require less radiation detectors 6. Thus, for example, a first evaluating device 5 may be provided with only even numbered and positioned radiation detectors 6, whereas a second evaluating device 5 may be provided only with odd numbered and positioned radiation detectors 6.

When the balls utilized in the device of the invention include vanadium, it is possible to provide activity measurements with the same balls at short intervals and to measure the activity of individual columns of balls simultaneously. The only mechanical components of the device of the invention are the ball stops. Due to the absense of other mechanical components, the device of the invention functions with great reliability.

While the invention has been described by means of specific examples and in specific embodiments, we do not wish to be limited thereto, for obvious modifications will occur to those skilled in the art without departing from the spirit and scope of the invention.

We claim:

1. A device for determining the flow distribution of neutrons in the fission zone of the nuclear reactor, comprising transfer tube means extending into the fission zone of a nuclear reactor;

a column of a plurality of loosely joined activatable balls movably positioned in said transfer tube means;

compressed gas means coupled to said transfer tube means for moving said columns of balls into and out of the fission zone of said nuclear reactor by compressed gas; and stationary evaluating means outside said reactor pressure vessel in operative proximity with said transfer tube means for measuring the activity of stationary columns of balls in said transfer tube means immediately after the balls leave the fission zone of the nuclear reactor, said stationary evaluating means extending alongside said transfer tube means and comprising a plurality of radiation detectors connected in parallel.

2. A device as claimed in claim 1, wherein each of said balls comprises a material having a half life of minutes.

3. A device as claimed in claim 1, wherein each of said balls comprises an alloy of 0.60 to 0.65 percent by weight of carbon, 14.0 to 15.0 percent by weight of chromium, 1.2 to 1.4 percent by weight of vanadium, and the remainder being iron and less than 0.1 percent by weight of impurities.

4. A device as claimed in claim 1, wherein each of the radiation detectors of said evaluating means comprises a semiconductor detector.

5. A device as claimed in claim 1, wherein each of the radiation detectors of said evaluating means comprises a Geiger-Mueller counter.

6. A device as claimed in claim 1, wherein said evaluating means comprises a plurality of evaluating devices each provided in operative proximity with a corresponding one of said transfer tube means for simultaneous measurement of the activity of the columns of balls in said transfer tube means.

7. A device as claimed in claim 1, wherein said evaluating means comprises a single evaluating device in operative proximity with said transfer tube means for consecutively measuring the activity of the columns of balls in said transfer tube means.

8. A device as claimed in claim 1, wherein a plurality of ball stops are provided in each of said transfer tube means beginning at a point after said evaluating means and spaced at distances from each other along the transfer tube means corresponding to the length along the transfer tube means of said evaluating means.

9. A device as claimed in claim 1, wherein the columns of balls are stored in the transfer tube means during the period between successive activations thereof.

10. A device as claimed in claim 1, wherein a ball stop is provided in each of said transfer tube means at a distance of one ball column length from the core of a nuclear reactor.

11. A device as claimed in claim 1, wherein a ball stop is provided in each of said transfer tube means at a distance of one ball column length from the core of a nuclear reactor, the column of balls in each of said transfer tube means being held by the corresponding one of said ball stops on the side of the nuclear reactor after activation of a column of balls in said transfer tube means and prior to evaluation by said evaluating means, and the column of balls in each of said transfer tube means being held by the corresponding one of said ball stops on the side of said evaluating means after evaluation of the corresponding column of balls by said evaluating means.

12. A device as claimed in claim 1, wherein the transfer tube means are divided into groups of transfer tube means each including a plurality thereof and said evaluating means comprises a plurality of evaluating devices of a number equal to the number of transfer tube means in a group each in operative proximity with a corresponding one of the transfer tube means of a group whereby the columns of balls of a group of transfer tube means are simultaneously measurable.

13. A device as claimed in claim 12, further comprising common compressed air means for the transfer tube means of said group coupled to each end of each of said transfer tube means.

14. A device as claimed in claim 12, wherein each of said evaluating devices comprises a plurality of radiation detectors positioned in staggered relation relative to each other.

15. A device as claimed in claim 13, wherein said compressed air means includes a source of compressed air at each end of each of the transfer tube means of said group, each of said sources of compressed air having a humidity sensor, a manometer and a rapid shutoff valve coupled thereto for cutting off a defective group of transfer tube means.

16. A device as claimed in claim 13, wherein said compressed air means comprises a source of compressed air coupled to each end of each of the transfer tube means of said group, an air outlet duct coupled between said sources of compressed air and a pressure relief valve in said air outlet duct.

17. A device as claimed in claim 12, wherein each of said evaluating devices comprises a plurality of radiation detectors spaced from each other at greater distances than in the other of said evaluating devices.

* * * * *